United States Patent Office.

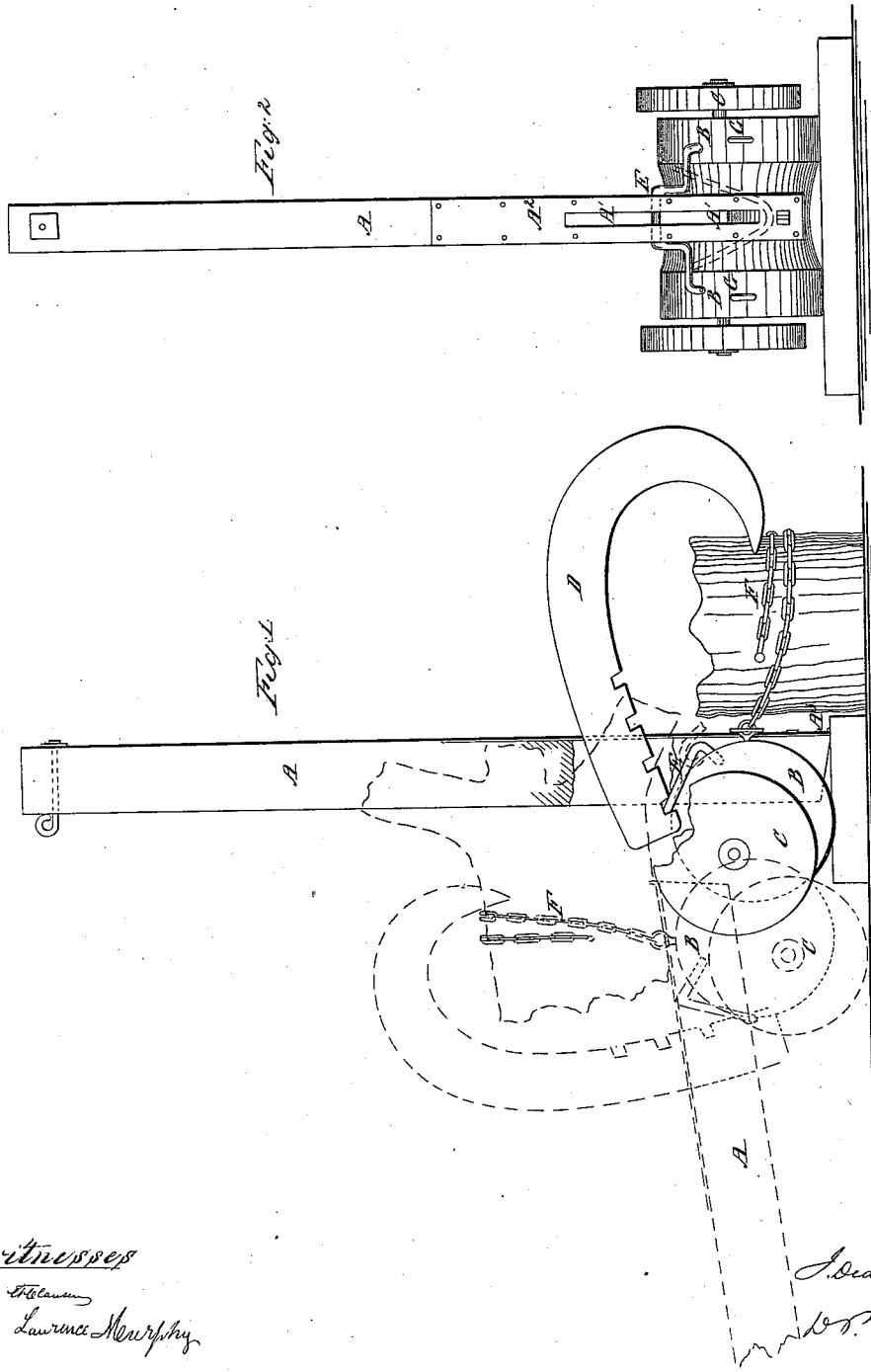

J. DEAN HUFFMAN, OF SPRINGFIELD, OHIO.

Letters Patent No. 64,106, dated April 23, 1867.

IMPROVEMENT IN STUMP-EXTRACTOR.

*The Schedule referred to in these Letters Patent and making part of the same.*

TO ALL WHOM IT MAY CONCERN:

Be it known that I, J. DEAN HUFFMAN, of Springfield, in the county of Clark, and State of Ohio, have invented a new and useful Improvement in Stump-Pullers and Grubbers; and I do hereby declare that the following is a full, clear, and exact description of the same, reference being had to the annexed drawings, making part of this specification, in which—

Figure 1 is a side elevation; and
Figure 2 is an end elevation.

The same letters in both figures are used in the indication of parts which are identical.

The red lines in fig. 1 indicate the action of the machine.

A is the lever, which is a strong beam, to which the draught is applied at the upper end. The lower end is securely fastened into a notch cut in the cylindrical fulcrum B, which rests upon the ground, and supports the lever when in a vertical position. The wheels C are attached to the cylindrical fulcrum by journals or axles, which are secured to and pass through the cylinder, projecting therefrom eccentrically at such point that when the lever is vertical the whole weight rests upon the cylindrical fulcrum, but when the lever is horizontal, as shown by the red lines on fig. 1, the weight rests upon the wheel C, which may now be used to draw the stump-puller from place to place. D is the extension hook, formed substantially as shown in fig. 1. It has inclined notches cut at intervals in its lower edge, so that it may be attached to the lever in such manner that it may be adjusted to the size of the stump over the top of which it passes, the pointed hook entering the stump. The hook is flat on top so as to give it bearing against the wood, and should be increased in thickness at the point for this purpose as well as to strengthen it where it diminishes in diameter. A slot, $A^1$, is cut through the lever to receive the extension hook, which is fastened by the notches to the stirrup E, a strong rod attached to the cylinder B in front and carried around the lever. An iron plate, $A^2$, formed in one piece is attached on the front of the lever at the lower end, having a projecting edge or bite at $A^3$. The stump-puller is also attached to the stump by chains F. These chains are secured to eyes G, fastened to the cylinder B, and are wrapped around the stump, and fastened by wedges driven into the stump. The lever should rest upon a solid block of wood, its lower end being bevelled to prevent the corner forming a fulcrum.

The extension hook being attached to the stump, and the chains F secured, the power is applied at the top of the lever, and the stump drawn from the ground, as shown in fig. 1. The extension hook and chains are designed to be used in extracting the large stumps; instead of these I use the clevis $x$ for pulling the smaller saplings. The clevis is a bent rod, with hooks at each end, which are to be hooked over the stirrup E, the clevis encircling the grub to be pulled up. The action of the machine is the same where the clevis is used as where the extension hook and chains are employed.

What I claim as my invention, and desire to secure by Letters Patent, is—

1. The lever A of a stump-puller, in combination with the cylindrical fulcrum B, supporting the wheel C eccentrically attached thereto, substantially in the manner and for the purpose set forth.

2. In combination with the slotted lever A, eccentrically attached, the fixed cylindrical fulcrum B, adjustable extension hook D, and stirrup E, when constructed and arranged substantially as set forth.

3. The arrangement of the slotted lever A with the plate $A^2$ and bite $A^3$, adjustable extension hook D, and chains F, and eccentrically-attached, fixed cylindrical fulcrum B, substantially as set forth.

4. In combination with the lever A, eccentrically-attached fixed cylindrical fulcrum B, and stirrup E, I claim the hooked clevis $x$, substantially as and for the purpose set forth.

In testimony whereof I have signed my name to this specification in the presence of two subscribing witnesses.

J. DEAN HUFFMAN

Witnesses:
D. A. HARRISON,
C. J. HARRISON.